Sept. 13, 1938.   H. G. LOMBARD   2,129,949
SECURING DEVICE
Filed Feb. 5, 1937
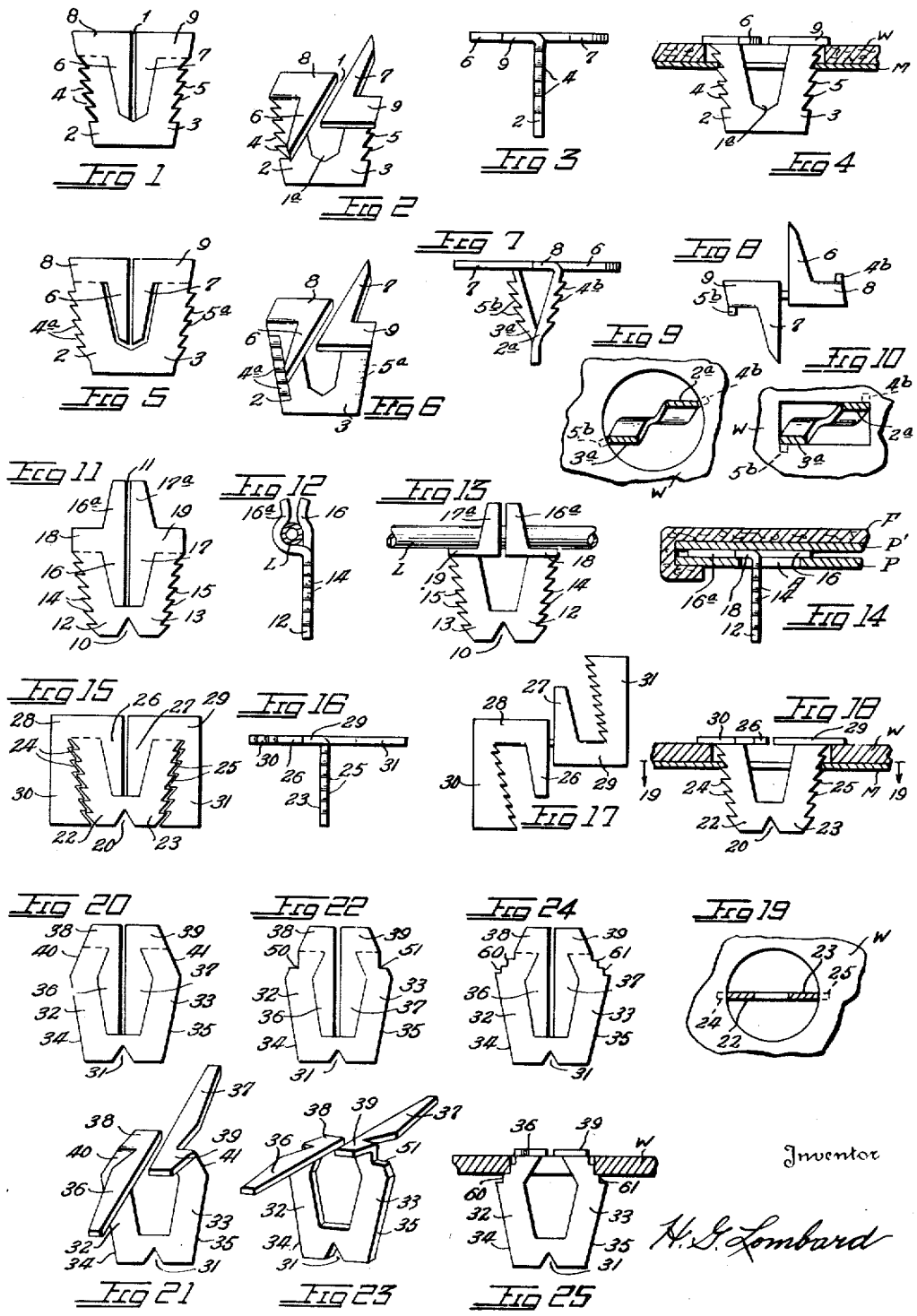

Patented Sept. 13, 1938

2,129,949

UNITED STATES PATENT OFFICE 2,129,949

SECURING DEVICE

Herman G. Lombard, Washington, D. C., assignor to Albert E. Tinnerman, Cleveland, Ohio Application February 5, 1937, Serial No. 124,307

13 Claims. (Cl. 85—5)

This invention relates to securing devices of general application and more particularly of the type constructed from relatively thin metal material of sheet or strip form such as, for example, sheet spring steel, sheet metal, cold rolled metal, and the like.

The securing devices of this invention comprise various forms of fastening means in which the shank members are composed of relatively yieldable leg sections, the outer longitudinal edges of which are designed to engage in a work aperture under compression in a friction or press fit with the side walls of such aperture, whereby the said leg elements are seated in applied fastening position under tension. The shank leg sections of the various devices may be deformed to provide integral leg, shoulder, or abutment means acting in conjunction with the relatively yieldable leg sections whereby a most effective engagement of the shanks in fastening position in the work is obtained.

The head members of the various forms of securing devices are provided from sections of material intermediate the shank sections and are so designed as to extend from or adjacent the free ends of the leg sections to serve as head members for the devices. The sections comprising the head member of a device are of such length that they may be bent or deformed into any suitable shape or configuration for cooperation with or connection to an object or part to be secured to a supporting member.

In general, securing devices of the type with which this invention deals are constructed of metal sheet material of suitable thickness such as strip stock, or blank stampings, because of the ease and simplicity with which the devices may be stamped and formed from such material. Fastening devices made of wire, and in which the shank structures and head members have the essential teachings and function in fastening position of the devices herein disclosed may also be readily constructed.

In any form of fastening device in which there is obtained a yieldable relative movement of the shank sections or shank elements an effective fastening means is provided in that on applying such a device to work in an aperture of less width or diameter than the spacing of overall width of the shank sections, a tension is set up in such shank sections in fastening position, which tension provides a friction press fit of the device in fastening position intended to prevent loosening and removal of the device from such position.

Heretofore such fastening devices have been employed with a certain degree of effectiveness in applications and installations where no great degree of movement or vibration is present in the work, or members fastened or supported. However, where any degree of strain, jarring or vibration takes place, the shanks of such types of fasteners tend to loosen from their fastening position and usually become completely removed due to the fact that the sections or elements comprising the shank do not possess sufficient inherent holding power and ability under such conditions.

It is therefore an object of this invention to provide various forms of fastening means and securing devices in which the shanks are composed of relatively yieldable sections so disposed with respect to each other as to permit quick, easy insertion of the devices into an aperture in work by flexing and relatively yielding thereof, yet when in fastening position have such a degree of stiffness, rigidity and tension stored therein through contact and compression against the side walls of the aperture, that a tension is set up in the shank sections in fastening position such that substantial resistance is offered to withdrawal of the devices, and extraordinary resistance is provided against loosening, or tendency of the devices accidentally moving from applied position due to the vibration, jarring or strain set up in the members fastened or supported, or in a member in which the devices are applied.

It is a further object of this invention to provide various forms and constructions of fastening means and securing devices in which the shank members are composed of relatively yieldable shank sections which are so spaced in normal relation to each other as to engage the side walls of the work aperture under compression in applied fastening position, whereby a tension is set up in the shank sections to effect a friction or press fit of the securing devices in such fastening position.

A further object of the invention is to provide securing devices the shank sections of which are so disposed in normal, spaced relation as to be placed under compression in contact against the aperture side walls to seat under tension in fastening position; and said shank sections being provided with integral, projecting or lug means such as shoulders, teeth, or cam surfaces serving to securely engage the work in fastening position, and rigidly retain the devices in such position under tension set up in the shank sections due to the relative contraction, compression, and movement thereof from their normal, spaced relation on being applied in a work aperture and advanced to fastening position, whereby an effective seating and locking of the devices in such fastening position is obtained due to the action of the shank sections attempting to assume their initial, normal, laterally spaced relation.

Another object of the invention is to provide securing devices composed of laterally spaced, relatively yieldable shank sections having head members composed from sections of material intermediate the spaced shank sections, and so disposed with respect to said shank sections as to be readily deformed for connection to a cooperating part or object to be secured or member to be supported.

Further objects of the invention will apear as a description thereof proceeds with reference to the accompanying drawing in which like reference characters designate like parts throughout the same, and in which:

Fig. 1 represents a blank outline for a form of securing device in which the head member is provided from integral sections deformed from the blank intermediate the shank sections of the device.

Fig. 2 is a front elevation of a securing device constructed from the blank of Fig. 1 with the head elements, deformed from the plane of the blank, shown in perspective.

Fig. 3 is an end elevation of Fig. 2.

Fig. 4 shows the device of Figs. 2 and 3 as applied to fastening position for securing superposed apertured layers of work.

Fig. 5 represents an alternate form of blank outline in which the teeth, lug, shoulder or abutment means of the shank extend beyond the longitudinal edges of the shank sections to be deformed relative thereto.

Fig. 6 is a front elevation of a securing device formed from the blank of Fig. 5 with the head elements shown in perspective.

Fig. 7 is an end elevation of Fig. 6 showing the shank sections spread in diverging relation toward the head with the lug, shoulder or abutment means deformed at a suitable angle thereto.

Fig. 8 is a top plan view of Fig. 7.

Fig. 9 is a section view of the shank of the device of Fig. 7 as applied to fastening position in a round aperture in work.

Fig. 10 is a similar view as applied to a rectangular aperture in work.

Fig. 11 represents a blank outline for an alternate construction in which the sections forming the head member are composed of oppositely disposed elements.

Fig. 12 is an end elevation of the shank of the device of Fig. 11 showing the elements of the head sections deformed to support and retain a wire, tube, line, cable, or the like.

Fig. 13 is a front elevation of Fig. 12.

Fig. 14 is an end elevation of a device formed from a blank such as shown in Fig. 11 with the head sections adapted for securing a panel or the like, in a panel installation.

Fig. 15 represents a blank outline for an alternate construction in which the device is stamped and formed from a substantially rectangular section of material.

Fig. 16 is an end elevation of a device constructed from the blank of Fig. 15.

Fig. 17 is a top plan view of Fig. 16 showing the several head elements which may be deformed as desired for connection to a cooperating part.

Fig. 18 shows the device of Figs. 16 and 17 as applied to fastening position for securing superposed layers of apertured work.

Fig. 19 is a section taken along line 19—19 of Fig. 18 showing the position of the shank sections as applied to a substantially round aperture in work.

Fig. 20 shows a blank outline for a securing device in which the outer longitudinal edges of the shank sections are provided with cam work-engaging edges permitting use of the device in the manner of a removable snap stud.

Fig. 21 is a front elevation of a completed fastener constructed from the blank of Fig. 20 with the head sections shown in perspective.

Fig. 22 represents a blank outline for a form of device in which the work-engaging edges of the shank sections are provided with pronounced shoulders adapted to positively retain the device in applied fastening position.

Fig. 23 is a perspective of the device constructed from the blank of Fig. 22.

Fig. 24 shows a blank outline for a securing device in which the work engaging edges of the shank sections are in the form of a plurality of stepped shoulders adapting the device for locking relation in various thicknesses of work.

Fig. 25 is a front elevation of a device constructed from the blank of Fig. 24 as applied to locked fastening position in a layer of work.

Figs. 1–4 inclusive disclose a form of securing device which may be constructed from a blank such as represented in Fig. 1. The blank is suitably slit during the stamping operation to define spaced shank sections 2, 3 intermediate which are provided head sections 6, 7 separated by a clearance slot 1 to permit flexing and relative lateral yielding movement of the shank sections. The head sections 6, 7 include portions 8, 9 integral with the shank sections and which are designed to be bent along the dotted lines, Fig. 1, to substantially the position shown in Figs. 2 and 3. The head sections at their extremities are preferably stamped in a V-shape configuration whereby a notch 1a, Fig. 2, is provided intermediate the shank sections facilitating flexing and relative yielding thereof. Along the outer longitudinal edges of the shank sections, lug, shoulder or abutment means such as teeth 4, 5 are provided adapted to rigidly engage in a work aperture and maintain the device securely in applied fastening position. In use, the device is applied to a work aperture having less width or diameter than the normal spacing of the outer longitudinal edges of the shank sections. As the device is advanced to fastening position, the outer longitudinal edges of the shank sections 2, 3 cam the aperture side walls and cause a relative contraction of the shank sections sufficient to pass the shank and seat the device in desired fastening position as shown in Fig. 4. When seated, the shank sections are disposed in relatively contracted relation in the aperture whereby the device is rigidly maintained in fastening position under tension by the expanding action of the shank legs abutting the aperture side walls in attempting to assume their normal, spaced relation. If desired, the outer longitudinal edges of the shank sections may be provided with lug, shoulder or abutment means such as teeth 4, 5 designed to engage the aperture side walls and adjacent underface of the supporting member such as a sheet metal support M to rigidly and securely retain the device in applied fastening position. As shown in Fig. 4, the head sections 6, 8 and 7, 9 overlie the aperture in a layer of material W to secure the same to the metal support M; the elongated head sections 6, 7, may also be suitably deformed for connection to a cooperating part such as molding, button, or finishing cap or for supporting an object such as a line, wire, cable, tube or the like.

Figs. 5 and 6 show a modified construction similar in application and use to that disclosed in Figs. 1-4 inclusive, but in which the lug, shoulder, or abutment means on the shank sections are so disposed as to extend beyond the outer longitudinal edges thereof as at 4a, 5a, to be bent at suitable angles to the shank sections for easy application and more effective engagement in a work aperture.

Figs. 7-10 inclusive show an alternate construction in which the lug elements such as teeth 4b, 5b are disposed at a suitable angle to shank sections 2a, 3a which are spread or flared transversely with respect to each other to extend in diverging relation toward the head sections as shown in Fig. 7. By thus spreading the shank sections transversely, a greater yielding relation thereof is obtained on application of the device to a work aperture in that the shank sections, in camming the aperture side walls, tend to contract transversely and also laterally from their normal spaced relation. As shown in Figs. 9 and 10 this form of device is readily adapted for use in either a substantially round aperture or a rectangular aperture. When designed for use in a round aperture the lug means 4b, 5b are disposed at such angle as to lie substantially along a radius of the aperture, for most effective engagement therein as shown in Fig. 9. When applied to a rectangular aperture as shown in Fig. 10, the lug means 4b, 5b are disposed substantially at right angles to the shank sections whereby a most rigid and effective engagement with the aperture side walls is obtained.

Figs. 11-14 inclusive disclose a form of securing device similar in application and use to that shown in Figs. 1-4 inclusive, but distinguished therefrom in the construction of the head sections forming the head member of the device. This type of device may be formed from a blank substantially as represented in Fig. 11 which is suitably slit during the stamping operation to provide head sections composed of oppositely disposed elements 16, 16a, and 17, 17a, separated by a slot 11 permitting relative yielding and flexing of the shank sections 12, 13. If desired a V-notch 10, or the like, may be provided between the shank sections to weaken their connection whereby to facilitate flexing and relative yielding thereof. Along the outer longitudinal edges of the shank sections, lug, shoulder or abutment means such as teeth 14, 15, may be provided. The blank, Fig. 11 is suitably deformed by bending the elements 18, 19, substantially along the dotted lines indicated, such that elements 16, 16a and 17, 17a extend free in opposite directions to be deformed as desired for connection to a cooperating part to be secured, or object to be supported. As shown in Figs. 12 and 13, the free ends of the head sections may be deformed to support a line L, wire, tube, cable or the like, with the portions 18, 19, acting as bearing sections resting upon the support or member to which the securing device is applied. Likewise, the head sections may be disposed substantially at right angles to the shank sections to lie in a substantially common plane whereby the head member is readily adapted for use in applications and installations where a flat head member is necessary or desirable. For example, in a panel installation such as represented in Fig. 14, the flat head member is readily applied to seat snugly between layers of an upholstered panel composed of panel P, a panel cover P' and a layer or fabric F. In connecting a device to the panel, one end of the head member is inserted into the aperture A of the panel P to overlie the same, whereupon the opposite end of the head may be seated in the aperture and the device moved in a direction such that both ends of the head will overlie the panel aperture. In use, a plurality of securing devices are similarly connected to a panel whereby the panel may be employed in an installation such as the door frame of an automobile. By a push or axial thrust applied to the heads of the securing devices, the same become seated in fastening position in apertures or sockets in the door frame to retain the panel in desired position.

Figs. 15-18 inclusive show a form of securing device which may be constructed from a stamped rectangular section as represented in Fig. 15, such as to provide laterally spaced integral shank sections 22, 23 suitably weakened as at 20 to permit ready flexing thereof. The head members are composed of irregular integral sections disposed on either side of the respective shank sections and comprise portions 27, 29, 31 and 26, 28, 30 respectively. The irregular sections defining the head members are suitably bent relative to the shank sections along the dotted lines indicated in Fig. 15 to positions substantially as shown in Fig. 17, whereby the projecting portions 26, 30, and 27, 31 may be deformed as desired for connection to a cooperating part to be secured, or object to be supported. Along the outer longitudinal edges of the shank sections, lug shoulder or abutment means, such as teeth 24, 25, may be provided for engaging the side walls and adjacent undersurfaces of a work aperture in a metal supporting member M, or the like, for securing in superposed relation thereon a layer of work W.

Figs. 20 and 21 illustrate a form of securing device which may be employed in the manner of a snap stud. The device may be constructed from a blank outline shown in Fig. 20, which is suitably slit during the stamping operation to provide spaced shank sections 32, 33 suitably weakened at 31, and head members composed of elements 36, 38, and 37, 39 taken from the material intermediate and adjacent the free ends of the shank sections. The head members are bent along the dotted lines shown in Fig. 20 to substantially the position shown in Fig. 21 where the free ends of elements 36, 37 may be suitably deformed for connection to a cooperating part. The outer longitudinal edges of the shank sections 32, 33 are so formed as to present guide edges 34, 35 and work engaging edges 40, 41 in the form of cam surfaces adapted to engage in a work aperture under tension of the relatively yieldable shank sections. On application to a work aperture, the guide edges 34, 35 cause a gradual, relative contraction of the shank sections such that the work engaging surfaces 40, 41 are properly seated in engagement with the lower corner edge of the work aperture. This form of device may be readily withdrawn by an axial force exerted on the head member whereupon the work engaging edges 40, 41 act as cam surfaces causing a relative contraction of the shank sections sufficient to pass the same through the work aperture and permit the device to be withdrawn.

In Figs. 22 and 23 is shown an alternate construction in which the work engaging surfaces are provided with sharp, pronounced shoulders 50, 51 designed to seat in the work aperture and engage the adjacent underface of the work to positively lock the device in applied fastening position.

Figs. 24 and 25 disclose a further construction in which the work engaging edges of the relatively yieldable shank sections are in the form of a plurality of stepped shoulders 60, 61 whereby the device is adapted for use in locking engagement in various thicknesses of work.

It will, therefore, be seen that the various forms of securing devices herein disclosed have a wide range of use and provide an effective fastening means which may be economically constructed from a section of material without necessitating the use of added material for the head members or involving the waste of material in providing for such head members.

A further advantage of the securing devices of this invention is obtained by the use of spaced, relatively yieldable shank sections which may be deformed with respect to each other in order to flex both in lateral and transverse directions on being applied to a work aperture.

A still further advantage resides in the use of lug, shoulder, or abutment means provided on the outer longitudinal edges of the relatively yieldable shank sections, which lug, shoulder or abutment means afford rigid, positive seating of the securing devices in fastening position by rigidly engaging the aperture side walls and adjacent underface of the work under tension stored in the shank sections.

While the invention has been described in detail with specific examples, such examples are illustrative and are not given as limitations, since other modifications within the spirit and scope of the invention will be apparent to those killed in the art. Hence the invention is to be understood as limited only as indicated in the appended claims, in which the intent is to set forth all the novelty over the prior art.

What is claimed is:

1. In a sheet metal securing device constructed from a blank stamping, a shank comprising laterally spaced, relatively yieldable shank sections substantially flat throughout and integral in the leading end of the device, an auxiliary section integral with one of said shank sections, said auxiliary section being provided from material of the stamping intermediate said shank sections and deformed relative thereto to serve as the head member of the device, at least one of said shank sections being provided with work engaging means.

2. In a sheet metal securing device constructed from a blank stamping, a shank comprising laterally spaced, relatively yieldable shank sections substantially flat throughout and integral in the leading end of the device, an auxiliary section integral with one of said shank sections, said auxiliary section being provided from material of the stamping intermediate said shank sections and deformed relative thereto to present oppositely disposed elements serving as the head member of the device, at least one of said shank sections being provided with work engaging means.

3. In a sheet metal securing device constructed from a blank stamping, a shank comprising laterally spaced, relatively yieldable shank sections lying in substantially the same plane and integral in the leading end of the device, auxiliary sections integral with said shank sections and formed from material intermediate said shank sections, said auxiliary sections being bent to present oppositely disposed elements adapted to be deformed for connection to a part to be fastened or for securing an object to be supported, and means carried by at least one of said shank sections designed to rigidly retain the device in applied position under tension.

4. For application to apertured work from one side of such work, a sheet metal securing device having a shank comprising laterally spaced, relatively yieldable, substantially flat shank sections integral in the entering end of the device, at least one of said shank sections being provided with work engaging means and the outer longitudinal edges of said shank sections, in normal relation, being of greater spacing than the width of the aperture in the work, whereby a gradual relative contraction of the said shank sections is effected to seat the device in fastening position in the work under tension.

5. For application to apertured work from one side of such work, a sheet metal securing device having a shank comprising laterally spaced, relatively yieldable, substantially flat shank sections lying in substantially the same plane and integral in the entering end of the device, the outer longitudinal edges of at least one of said shank sections being provided with work engaging means and, in normal relation, being of greater spacing than the width of the aperture in the work, whereby a gradual relative contraction of the shank sections is effected on advancing the device in the work aperture, and a seating thereof under tension in fastening position is obtained due to the action of the shank sections attempting to assume their normal spaced relation.

6. For application to apertured work from one side of such work, a sheet metal securing device having a shank comprising laterally spaced, relatively yieldable shank sections substantially flat throughout and integral in the entering end of the device, the outer longitudinal edges of said shank sections, in normal relation, being of greater spacing than the width of the aperture in the work and carrying means designed for positive engagement in the work aperture, whereby a gradual, relative contraction of the shank sections is effected on advancing the device in the work aperture and a seating and positive engagement under tension of the means carried by said shank sections in fastening position is obtained.

7. For application to apertured work from one side of such work, a sheet metal securing device having a shank comprising spaced, substantially flat shank sections integral in the entering end of the device, and means intermediate said spaced shank sections so disposed as to serve as the head member of the device, the outer longitudinal edges of at least one of said spaced shank sections being provided with work engaging means and, in normal relation, being of greater spacing than the width of the work aperture whereby said shank sections are contracted on being advanced to fastening position and the device is seated under tension in the work.

8. For application to apertured work from one side of such work, a sheet metal securing device having a shank comprising spaced, substantially flat shank sections integral in the entering end of the device and lying substantially in the same plane, and means intermediate said spaced shank sections so disposed as to serve as the head member of the device, the outer longitudinal edges of at least one of said spaced shank sections being provided with work engaging means and, in normal relation, being of greater spacing than the width of the work aperture and extending in diverging relation toward the head member, whereby a gradual relative contraction of said spaced shank sections is effected on being advanced to fastening position and the device is seated under tension in the work.

9. For application to apertured work from one side of such work, a sheet metal securing device having a shank comprising spaced, substantially flat shank sections integral in the entering end of the device and lying substantially in the same plane, and means intermediate said spaced shank sections so disposed as to serve as the head member of the device, the outer longitudinal edges of said spaced shank sections, in normal relation, being of greater spacing than the width of the work aperture and extending in diverging relation toward the head member, abutment means carried by said shank sections designed to securely engage in the work, whereby upon application of the device to the work aperture, a gradual relative contraction of the spaced shank sections is effected and said abutment means are caused to engage the work under tension.

10. A sheet metal securing device including a head, and a shank, said shank comprising laterally spaced, substantially flat, relatively yieldable shank sections integrally united to form a leading end, means intermediate said shank sections serving as the head member of the device, said shank sections having outer longitudinal edges extending in diverging relation toward said head member, said longitudinal edges being provided with integral means designed for rigid engagement in an aperture in work.

11. A sheet metal securing device including a head, and a shank, said shank comprising laterally spaced, relatively yieldable shank sections integrally united to form a leading end and lying in substantially the same plane, means intermediate said shank sections serving as the head member of the device, said shank sections having outer longitudinal edges extending in diverging relation toward said head member, and including guide surfaces and pronounced shoulder means adapted to rigidly engage in an aperture in work under tension and retain the device in applied position in such work.

12. A sheet metal securing device including a head, and a shank, said shank comprising laterally spaced, substantially flat, relatively yieldable shank sections lying substantially in the same plane, means intermediate said shank sections serving as the head member of the device, said shank sections being integrally united in the leading end thereof and having outer longitudinal edges extending in diverging relation toward said head member and including guide surfaces and a plurality of lug means designed to rigidly engage the work under tension, such that the device is adapted for use in various thicknesses of work and is retained under tension in applied position in such work.

13. A sheet metal securing device including a head, and a shank, said shank comprising laterally spaced, substantially flat, relatively yieldable shank sections integrally united to form a leading end, means intermediate said shank sections serving as the head member of the device, said shank sections having outer longitudinal edges extending in diverging relation toward said head member and including guide surfaces and a plurality of stepped recesses presenting a series of shoulders adapted to rigidly engage in the work, whereby the device is adapted for use in various thicknesses of work and is retained under tension in applied position in such work.

HERMAN G. LOMBARD.

CERTIFICATE OF CORRECTION.

Patent No. 2,129,949. September 13, 1938.

HERMAN G. LOMBARD.

It is hereby certified that the name of the assignee in the above numbered patent was erroneously described and specified as "ALBERT E. TINNERMAN" whereas said name should have been described and specified as ALBERT H. TINNERMAN, as shown by the record of assignments in this office; and that the said Letters Patent should be read with this correction therein that the same may conform to the record of the case in the Patent Office.

Signed and sealed this 31st day of January, A.D. 1939.

Henry Van Arsdale
Acting Commissioner of Patents.

(Seal)

provided with work engaging means and, in normal relation, being of greater spacing than the width of the work aperture and extending in diverging relation toward the head member, whereby a gradual relative contraction of said spaced shank sections is effected on being advanced to fastening position and the device is seated under tension in the work.

9. For application to apertured work from one side of such work, a sheet metal securing device having a shank comprising spaced, substantially flat shank sections integral in the entering end of the device and lying substantially in the same plane, and means intermediate said spaced shank sections so disposed as to serve as the head member of the device, the outer longitudinal edges of said spaced shank sections, in normal relation, being of greater spacing than the width of the work aperture and extending in diverging relation toward the head member, abutment means carried by said shank sections designed to securely engage in the work, whereby upon application of the device to the work aperture, a gradual relative contraction of the spaced shank sections is effected and said abutment means are caused to engage the work under tension.

10. A sheet metal securing device including a head, and a shank, said shank comprising laterally spaced, substantially flat, relatively yieldable shank sections integrally united to form a leading end, means intermediate said shank sections serving as the head member of the device, said shank sections having outer longitudinal edges extending in diverging relation toward said head member, said longitudinal edges being provided with integral means designed for rigid engagement in an aperture in work.

11. A sheet metal securing device including a head, and a shank, said shank comprising laterally spaced, relatively yieldable shank sections integrally united to form a leading end and lying in substantially the same plane, means intermediate said shank sections serving as the head member of the device, said shank sections having outer longitudinal edges extending in diverging relation toward said head member, and including guide surfaces and pronounced shoulder means adapted to rigidly engage in an aperture in work under tension and retain the device in applied position in such work.

12. A sheet metal securing device including a head, and a shank, said shank comprising laterally spaced, substantially flat, relatively yieldable shank sections lying substantially in the same plane, means intermediate said shank sections serving as the head member of the device, said shank sections being integrally united in the leading end thereof and having outer longitudinal edges extending in diverging relation toward said head member and including guide surfaces and a plurality of lug means designed to rigidly engage the work under tension, such that the device is adapted for use in various thicknesses of work and is retained under tension in applied position in such work.

13. A sheet metal securing device including a head, and a shank, said shank comprising laterally spaced, substantially flat, relatively yieldable shank sections integrally united to form a leading end, means intermediate said shank sections serving as the head member of the device, said shank sections having outer longitudinal edges extending in diverging relation toward said head member and including guide surfaces and a plurality of stepped recesses presenting a series of shoulders adapted to rigidly engage in the work, whereby the device is adapted for use in various thicknesses of work and is retained under tension in applied position in such work.

HERMAN G. LOMBARD.

CERTIFICATE OF CORRECTION.

Patent No. 2,129,949. September 13, 1938.

HERMAN G. LOMBARD.

It is hereby certified that the name of the assignee in the above numbered patent was erroneously described and specified as "ALBERT E. TINNERMAN" whereas said name should have been described and specified as ALBERT H. TINNERMAN, as shown by the record of assignments in this office; and that the said Letters Patent should be read with this correction therein that the same may conform to the record of the case in the Patent Office.

Signed and sealed this 31st day of January, A.D. 1939.

Henry Van Arsdale (Seal) Acting Commissioner of Patents.